(12) United States Patent
Werner (10) Patent No.: US 7,359,916 B2
(45) Date of Patent: Apr. 15, 2008

(54) DATABASE MANAGEMENT SYSTEMS AND METHODS FOR MANAGING A DATABASE

(75) Inventor: Horst Werner, Rettigheim (DE)

(73) Assignee: SAP AG, Walldorf (DE)

( * ) Notice: Subject to any disclaimer, the term of this patent is extended or adjusted under 35 U.S.C. 154(b) by 456 days.

(21) Appl. No.: 11/037,077

(22) Filed: Jan. 19, 2005

(65) Prior Publication Data

US 2005/0187952 A1    Aug. 25, 2005

(30) Foreign Application Priority Data

Jan. 19, 2004   (EP)   ................................. 04075167

(51) Int. Cl.
    *G06F 17/30*    (2006.01)

(52) U.S. Cl. .................. 707/103 R; 707/203; 715/511; 715/530

(58) Field of Classification Search .................... 707/3, 707/4, 103 R, 203; 715/511, 530
    See application file for complete search history.

(56) References Cited

U.S. PATENT DOCUMENTS

| | | | | |
|---|---|---|---|---|
| 5,701,400 | A | * | 12/1997 | Amado ........................ 706/45 |
| 6,065,002 | A | * | 5/2000 | Knotts et al. .................. 707/4 |
| 6,134,546 | A | * | 10/2000 | Bestgen et al. ................. 707/4 |
| 6,154,756 | A | * | 11/2000 | Hearn et al. ................ 715/530 |
| 6,311,191 | B1 | * | 10/2001 | Retallick ................. 707/104.1 |

(Continued)

OTHER PUBLICATIONS

Laks V.S. Lakshmanan et al., "On Querying Spreadsheets," Data Engineering, 1998. Proceedings., 14th International Conference on Orlando, FL, Feb. 23-27, 1998, Los Alamitos, CA, USA, IEEE Comput. Soc., US, Feb. 23, 1998, pp. 134-141.

(Continued)

*Primary Examiner*—Shahid A Alam
(74) *Attorney, Agent, or Firm*—Finnegan, Henderson, Farabow, Garrett & Dunner, L.L.P.

(57) ABSTRACT

Database management systems and methods for managing a database are disclosed. In one embodiment, a database management system is provided that comprises a database layer including a database for storing data, and a spreadsheet layer for representing data from the database layer in a spreadsheet in accordance with a view, wherein the view causes at least one of a delivery of data to the spreadsheet layer from the database layer and a maintenance of data from the spreadsheet layer to the database layer. The system may further comprise an interface layer arranged to interface the database layer with the spreadsheet layer, wherein the database layer stores in the database data corresponding to a plurality of entities of a plurality of entity types in a plurality of tables, respectively, wherein the plurality of entities are linked by a plurality of relations in a predetermined structure, and further wherein the interface layer comprises a semantic net server for transforming the structure of the data in the database layer into a semantic net and the view is defined in terms of the semantic net to facilitate an interoperability between the database layer and the spreadsheet layer.

36 Claims, 2 Drawing Sheets

U.S. PATENT DOCUMENTS

| | | | |
|---|---|---|---|
| 6,327,597 B1* | 12/2001 | McKinley et al. | 707/206 |
| 6,460,043 B1* | 10/2002 | Tabbara et al. | 707/100 |
| 6,480,836 B1* | 11/2002 | Colby et al. | 707/102 |
| 6,594,653 B2* | 7/2003 | Colby et al. | 707/102 |
| 6,735,593 B1* | 5/2004 | Williams | 707/102 |
| 6,768,986 B2* | 7/2004 | Cras et al. | 707/103 R |
| 2002/0013786 A1* | 1/2002 | Machalek | 707/503 |
| 2002/0095399 A1* | 7/2002 | Devine et al. | 707/1 |
| 2003/0182287 A1 | 9/2003 | Parlanti | |
| 2004/0210564 A1* | 10/2004 | Oksanen | 707/3 |

OTHER PUBLICATIONS

Anne-Claire Boury-Brisset, "Ontology-based Approach for Information Fusion," Defense R&D Canada—Valcartier., Conference Proceedings Article, vol. 1, Jul. 8, 2003, pp. 522-529.

Jaime A. Reinoso Castillo et al., "Information Extraction and Integration from Heterogeneous, Distributed, Autonomous Information Sources—A Federated Ontology-Driven Query-Centric Approach," Artificial Intelligence Research Laboratory, Department of Computer Science, Iowa State University, Conference Proceedings Article, Oct. 27, 2003, pp. 183-191.

European Search Report, dated Sep. 29, 2004, 3 pages.

* cited by examiner

DATABASE MANAGEMENT SYSTEMS AND METHODS FOR MANAGING A DATABASE

DESCRIPTION OF THE INVENTION

1. Technical Field

The present invention generally relates to the field of data processing. More particularly, embodiments of the invention relate to database management systems and methods for managing a database.

2. Background Information

Databases and other repositories for data are well known for storing data. Further, applications for displaying data in a spreadsheet, or similar representations are known. Such applications are referred to hereinafter as representation applications.

One problem with conventional representation applications is that it is not possible for a user to transfer the contents of a database to a spreadsheet and vice versa without in-depth knowledge of the relevant database query language, for example, structured query language (SQL) and the internal data structure of the database. Conventionally, a structured query language (SQL) query for a desired view on the database contents is defined. Further, a hard-coded program creating a spreadsheet from the view contents is defined. Such a view cannot be defined by a typical user since it requires knowledge of SQL and the internal data structure of the database. Furthermore, it is very complex to create a view that integrates data from different databases or other repositories.

In view of the foregoing, it is an object of the present invention to address such problems encountered with conventional databases and with representation applications or spreadsheet layers which are part of a database application. For the sake of simplicity, both separate spreadsheet applications and spreadsheet layers integrated into other applications are referred to hereinafter as spreadsheet layers.

Furthermore, it is an object of the present invention to transfer database contents to a spreadsheet representation and, alternatively, to incorporate changes which are made in the spreadsheet in the original database.

SUMMARY

According to a first embodiment consistent with the present invention, there is provided a database management system comprising a database layer including a database for storing data, a spreadsheet layer for representing data from the database layer in a spreadsheet in accordance with a view, wherein the view causes at least one of a delivery of data to the spreadsheet layer from the database layer and a maintenance of data from the spreadsheet layer to the database layer. As further disclosed herein, the system may further comprise an interface layer arranged to interface the database layer with the spreadsheet layer, wherein the database layer stores in the database data corresponding to a plurality of entities of a plurality of entity types in a plurality of tables, respectively, wherein the plurality of entities are linked by a plurality of relations in a predetermined structure, wherein the interface layer comprises a semantic net server for transforming the structure of the data in the database layer into a semantic net, and further wherein the view is defined in terms of the semantic net to facilitate an interoperability between the database layer and the spreadsheet layer.

By providing a semantic net infrastructure on top of the database contents, embodiments consistent with the present invention may allow database contents to be transferred to a representation, for example, a spreadsheet without requiring the user to have any knowledge of the database structure or query language. A further advantage of embodiments consistent with the present invention is that the spreadsheet layer does not need to be modified since the exchange of view and result may be done completely via a clipboard.

According to a second embodiment consistent with the present invention, there is provided a method for managing a database. The method may comprise: storing data in a database in a database layer; and representing data from the database layer in a spreadsheet in accordance with a view, wherein the view causes at least one of a delivery of data to the spreadsheet layer from the database layer and a maintenance of data from the spreadsheet layer to the database layer. The method may further include interfacing the database layer with the spreadsheet layer, wherein the database layer stores in the database data corresponding to a plurality of entities of a plurality of entity types in a plurality of tables, respectively, and wherein the plurality of entities are linked by a plurality of relations in a predetermined structure. Further, the interfacing step may include the step of transforming the structure of the data in the database layer into a semantic net and the representing step may include the step of inputting the view defined in terms of the semantic net in order to facilitate an interoperability between the database layer and the spreadsheet layer.

According to a further embodiment of the present invention, there is provided a user terminal comprising means operable to perform methods consistent with the present invention.

According to yet another embodiment of the present invention, there is provided a program storage device readable by a processing apparatus, the device embodying a program of instructions executable by the processor to perform methods consistent with the present invention.

Additional objects and advantages of embodiments consistent with the invention will be set forth in part in the description which follows, and in part will be obvious from the description, or may be learned by practice of embodiments of the invention. The objects and advantages of embodiments of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles consistent with the present invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
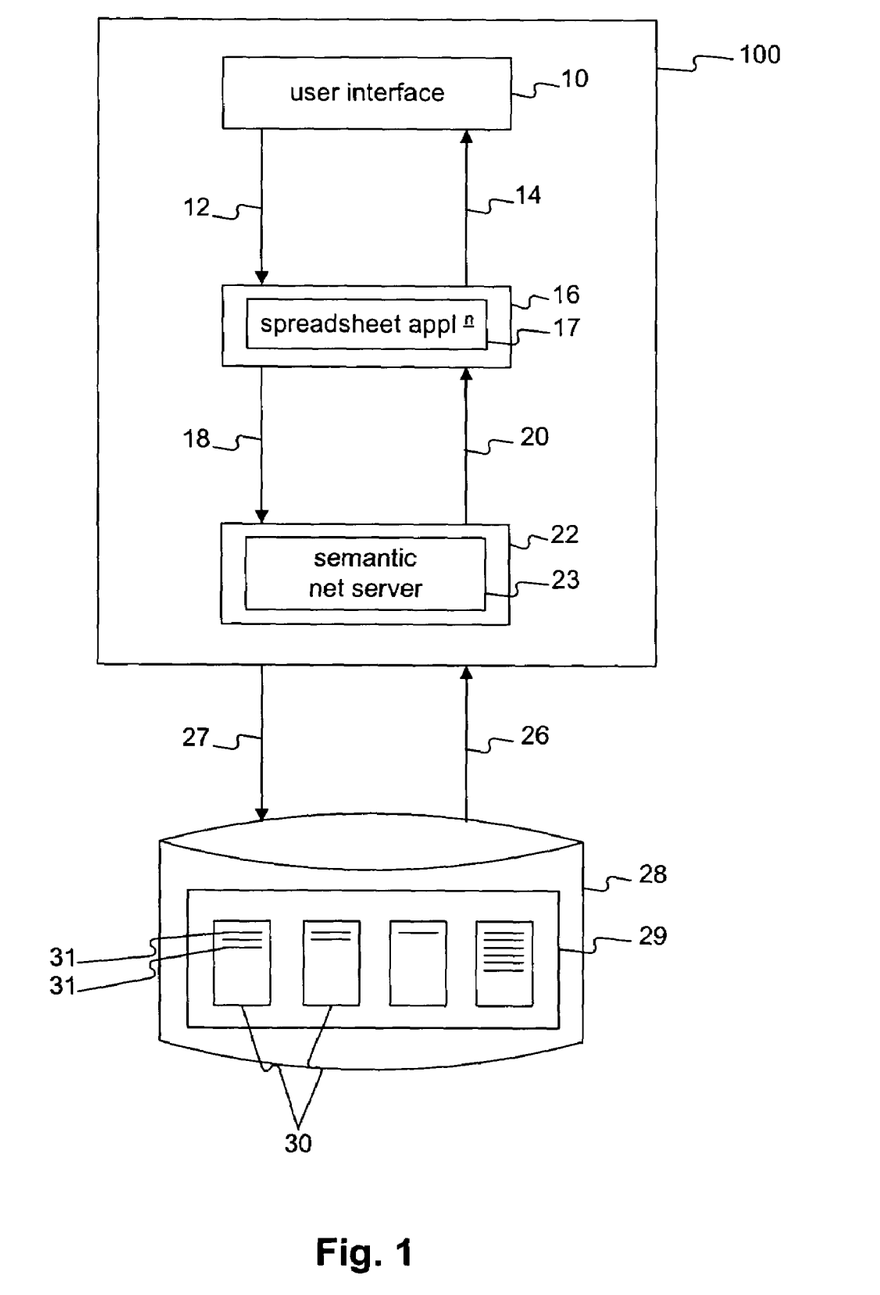
FIG. 1 shows an exemplary system architecture incorporating an embodiment of the present invention.

FIG. 1 shows an exemplary system architecture incorporating an embodiment of the present invention. In FIG. 1, a system 100 is illustrated in which methods described hereinafter may be implemented and, in particular, data flow and data processing steps consistent with embodiments of the present invention. As further described herein, system 100 may be implemented as a database management system.

As shown, the system 100 may include a user interface 10, such as a graphic user interface (GUI), with which a user interacts. Typically, the user inputs a view 12 to a spreadsheet layer 16. The spreadsheet layer 16 is a layer for generating a spreadsheet representation of data. The spreadsheet layer 16 may include software for representing data in the form of a spreadsheet or the like. Spreadsheet logic is a program that may display data in rows and columns on a display. It has a variety of uses, for example, for accounting or bookkeeping. Typically, the program is able to manipulate numerical and string data in rows and columns of cells. Other typical features of the spreadsheet program may include, but are not limited to: the value in a cell can be calculated from a formula which can involve other cells; a value may be recalculated automatically whenever a value on which it depends changes; different cells may be displayed with different formats, etc. Typical spreadsheet layers include Microsoft's Excel, Lotus 1-2-3, etc. Embodiments of the invention are not limited with respect to any particular spreadsheet program used.

A view may represent a request with respect to data. For example, it may cause delivery of data from a database layer 28 to the spreadsheet layer. Alternatively, it may cause data in the spreadsheet to be maintained to the database layer 28. A view may be provided by a user or generated by the system. The view 12 may include a request to have certain data represented or displayed. Having provided a view, the user may receive an output in the form of a delivery of data 14 from the application server 16 representing the results of the corresponding query. The spreadsheet layer 16 runs the spreadsheet logic which carries out the representation; in particular, the provision of the data in the desired format, for example, a spreadsheet.

The system 100 may further include an interface layer 22 for interfacing the spreadsheet layer 16 and a database layer 28. The database layer 28 may include a database 29, for example, a business application database. In one embodiment, the database is a relational database, wherein data is stored corresponding to a plurality of entities of a plurality of entity types in a plurality of tables, respectively, and wherein the plurality of entities are linked by a plurality of relations in a predetermined structure. The interface layer 22 may include a semantic net server 23 for storing the data belonging to different entity types (in respective tables) and relations between entities of these types as a semantic net. Further, by providing a semantic net (ontology) infrastructure on top of the database contents, which provides a semantic model of the relations between database contents and at the same time serves as an access layer that integrates contents from different repositories, a generic interface to a representation program may be realized. The relations may, for example, be stored by foreign key references in the underlying databases. In one embodiment, a query is performed on the database to collect data according to the defined view and these data are filled into a spreadsheet in a certain structure. In an another embodiment, the data in a filled-in spreadsheet is read and its contents written into the database.

The database 29 may have a structure 30 and contents 31. In the example shown, only one database layer including one database 29 is shown. Embodiments of the invention are not limited in this respect, since the interface layer is arranged to interface at least one database. For example, a plurality of databases may be interfaced by the semantic net server 23.

Data may be exchanged between the spreadsheet layer 16 and the interface layer 22 as shown by arrows 18, 20 in FIG. 1. Similarly, data may be exchanged between the interface layer 22 and the database layer 28, as shown by arrows 27, 26.

In one embodiment of the present invention, the structure 30 of the database is mapped onto terms and relation types in an ontology stored in a semantic net within the semantic net server 23. Preferably, the database contents 31 are mapped onto sub-terms of the terms. Further, the view (also referred to in the art as a query) defined by a user on the system is dynamically defined as a semantic view in terms and relation types of the ontology. In a preferred embodiment, the database contents may first be replicated in an ontology (semantic net structure) which is persisted in a database. The semantic view, that is as defined, is then used to collect the data from the semantic net structure as stored in the semantic net server 23. The replication and at the same time mapping of the database contents may be done only once, or alternatively intermittently. For example, on a regular basis, such as an overnight batch job. In this way, the replicated data is kept up to date.

In another embodiment of the invention, the semantic net structure is persisted only for the entity types and associated with mapping information that can be used to translate the view into a technical (SQL) view and the results are placed into the required structure so that a semantic net structure for the entities themselves is not needed. In this embodiment, the technical view collects only the required data from the database or databases. The collected data is then mapped onto the semantic net terms and relations as stored in the semantic net server 23 to fill in the spreadsheet. The semantic query may be defined in the spreadsheet layer 16, for example, by filling in a title row in the spreadsheet, which contains in each cell a relation name corresponding to one or more foreign key references in the database(s) and/or the semantic term corresponding to one or more database entity types of the item to write in or be read from the cell under the respective title row cell. Examples for the title row include:

"customer/has purchased product/lives in city",

"customer/has purchased/lives in",

"customer/product/city".

In a further embodiment, by providing a semantic net infrastructure, a generic interface to a spreadsheet program 17 may also be carried out in the following way. In the user interface 10 to the spreadsheet application 17, the user enters a title line where each cell contains the entity type of the elements to be shown in the respective column. The first cell is by default the "master" entity, which means that in each line, the attributes or relations contained by the following cells, the dependent cells, refer to the object found in the first cell. In the cells following the master cell, the type of relation between the cell content and the entity in the corresponding master cell is specified before the entity type if that relation type is not unambiguous.

For example, in one embodiment, a title line may read as follows:

| Task | refers to function | handled by person | has attribute Status |
|------|--------------------|--------------------|-----------------------|

For an export of data from the database to the spreadsheet application, the title line may be transferred to the business application containing the semantic net model. This is carried out, for example, by copying the business application database 29 onto a clipboard. Then, a set of entities of the master type is selected and the export is triggered. In the example above, the master type is "Task". The title line is parsed and then the first column is filled with the selected entities. The other columns are filled with the respective attributes or relations.

The relation types: "refers to", "handled by", "has attribute", can be left out if there is only one kind of relation between the master entity type and the entity type of the respective cell or if the attribute name is unambiguous.

For an import of changes in a spreadsheet into the business application database 29, the whole spreadsheet including the title line may be transferred to the business application. Again, the clipboard represents a convenient way of doing this. After parsing the title line, the structure of the spreadsheet is known to the application and the contents can be first aligned with the semantic net representation and, in a second step or immediately, depending on the implementation, the changes may be written to the respective repositories.

In order to handle more complex views (also referred to as queries in the art), including attributes or relations of entities in dependent cells, a mark may be included in a dependent title cell, indicating that the content of this particular dependent cell is to be considered as the master for the following cell. A further mark may be defined to indicate that the original master is to be considered valid for the contents of the following cells again.

By way of example,

| Task | function | (person | department) | Status |
|------|----------|---------|-------------|--------|

In this example, the parenthesis before "person" indicates that the following cells, in this example "department", refer to the person in the line, rather than the task. The closing parenthesis after "department" indicates that the original master cell, in the example "task", is valid again for the following cells. In a further embodiment, these structures may be nested.

In one embodiment of the present invention, there is provided a database management system comprising a database layer 28 including a database for storing data, a spreadsheet layer 16 for representing data from the database layer 28 in a spreadsheet in accordance with a view, wherein the view causes at least one of a delivery of data to the spreadsheet layer from the database layer and a maintenance of data from the spreadsheet layer to the database layer. The system may further comprise an interface layer 22 arranged to interface the database layer 28 with the spreadsheet layer 16, wherein the database layer 28 stores in the database data corresponding to a plurality of entities of a plurality of entity types in a plurality of tables, respectively, wherein the plurality of entities are linked by a plurality of relations in a predetermined structure, wherein the interface layer 22 comprises a semantic net server 23 for transforming the structure of the data in the database layer 28 into a semantic net, and further wherein the view is defined in terms of the semantic net in order to facilitate an interoperability between the database layer 28 and the spreadsheet layer 16. In this way, the average user is able to derive a spreadsheet representing an arbitrary view on contents of a business application database with minimum effort and without knowledge of the internal structure of the databases and without programming skills.

Embodiments of the present invention are applicable to one or more spreadsheet layers. It will be understood that depending on the spreadsheet layer or applications comprised in the system 100, the system may include a plurality of GUIs and associated spreadsheet layers. Although, only one GUI and spreadsheet layer 16 is shown in FIG. 1, other GUIs and spreadsheet layers may also be comprised in the system. The interface being able to interface a plurality of spreadsheet layers with a plurality of database layers. In a preferred embodiment, the interface 22 is adapted to facilitate, in response to the view, the data 31 in the database 29 to be represented in the spreadsheet. In this way, data 31 may be exported from the database 29 to the spreadsheet representation 17. Further, the interface layer may be arranged so that the data is represented in the representation to be stored in the database 29. In this way, data may be exported from the spreadsheet to the database 29. Further, if an input causes the data in the spreadsheet to be changed, any change in the data may be stored in the database 29. In this way, changes made in the spreadsheet may be exported to the database 29 without the user having to have any knowledge of the database programming language. In particular, the semantic net server 23 stores a semantic net of the relations between the data 31 in the database layer 28.

In a further embodiment, the view is defined for the data in the database 29 to collect data, and the collected data are represented in the spreadsheet in a predetermined structure. In particular, the semantic net server 23 stores a mapping of the structure of the database 29 onto a plurality of terms and relation types in a semantic net. Further, the semantic net server 23 stores a mapping of the data representing contents of the database 29 onto a plurality of sub-terms corresponding to the plurality of terms, respectively. Also, the view may be defined in terms of the plurality of terms and relation types of the semantic net. In a further embodiment, the semantic net server 23 is arranged to replicate the data contents of the database 29 in the semantic net. Preferably, the interface layer 22 is arranged to interpret the view and to identify particular data from the semantic net according to the view.

In an another embodiment, the interface layer 22 is arranged to translate the view into a database server 28 compatible view, wherein the database server compatible view is used to collect the data from the database 29. Further, the semantic net server 23 is arranged to map the collected data onto the terms and relations of the semantic net, wherein the mapped data is included in the spreadsheet.

As mentioned, the representation may be a spreadsheet including at least a title row, wherein the view is defined by entering a view in the title row, wherein the title row includes at least one of a plurality of cells which is associated with a particular relation respectively, and further wherein the relation corresponds to one or more foreign key references, and a semantic term corresponding to one or more database entity types of the view.

In a further embodiment, the view is used to perform a query on the database to collect data and these data are imported into a spreadsheet generated by the spreadsheet layer 17 according to a predetermined structure. In this way, although the structure of the database 29 and the representation may be unrelated, data may be transferred between them easily without the user requiring knowledge of the structure of the database. Further, the data represented in a representation generated by the spreadsheet layer is imported via the interface layer 22 to the database 29.

Figure 2:
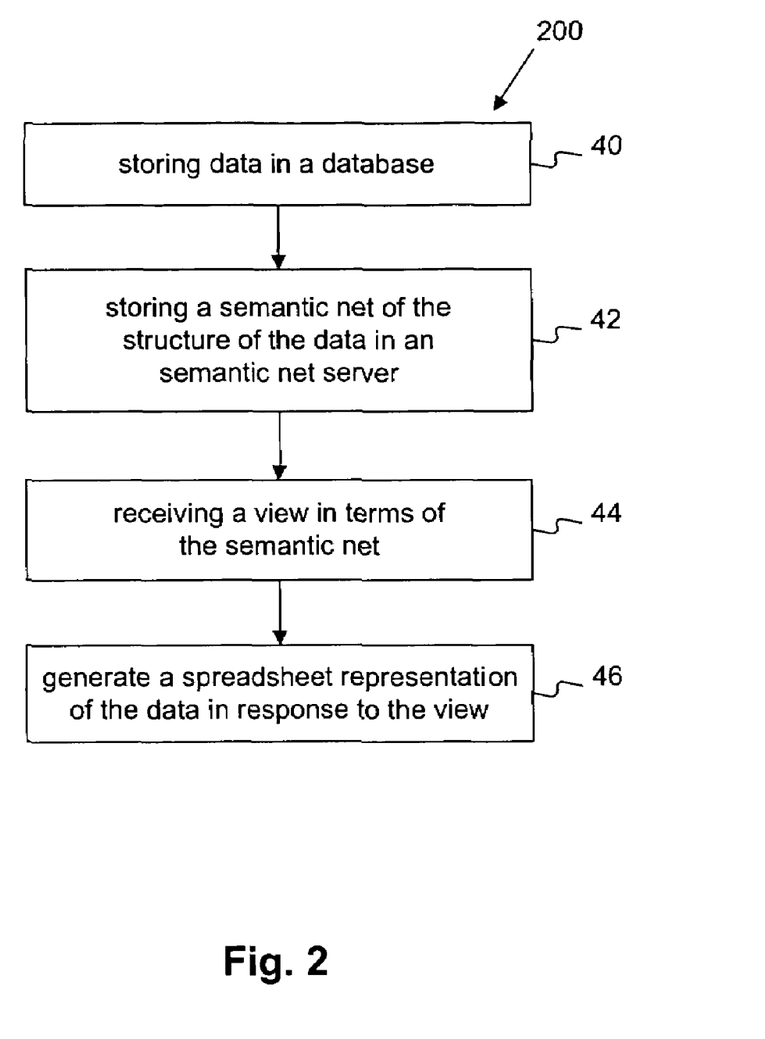
FIG. 2 shows a flow diagram incorporating an exemplary method for managing data, in accordance with an embodiment of the present invention.

FIG. 2 shows a flow diagram incorporating an exemplary method 200 for managing a database, consistent with an embodiment of the invention. The method 200 may be implemented using a database management system, such as that illustrated in FIG. 1. The method may comprise the step of storing data in a database, such as database 29 in a database layer 28. The method may further include the step of representing data from the database layer in a spreadsheet in accordance with a view, wherein the view causes at least one of a delivery of data to the spreadsheet layer from the database layer and a maintenance of data from the spreadsheet layer to the database layer.

Consistent with an embodiment of the invention, the method may include the further steps of: interfacing the database layer 28 with the spreadsheet layer 16, wherein the database layer 28 stores in the database data corresponding to a plurality of entities of a plurality of entity types in a plurality of tables, respectively, wherein the plurality of entities are linked by a plurality of relations in a predetermined structure. The interfacing step may include the step of transforming the structure of the data in the database layer 28 into a semantic net, and the representing step may include the step of inputting the view defined in terms of the semantic net, to facilitate an interoperability between the database layer 28 and the spreadsheet layer 16.

As can be seen, an exemplary method 200 is shown which includes the steps of storing data corresponding to a plurality of entities which are linked by a plurality of relations in a predetermined structure in the database (step 40), storing a semantic net of the structure of the data in the database in the semantic net server (step 42), and arranging the spreadsheet layer to receive a view (step 44) and generate a representation of data as a spreadsheet in response to the view (step 46), wherein the view is defined in terms of the semantic net to facilitate an interoperability between the database and the spreadsheet layer.

The method 200 may include the further step of arranging the interface layer 22 so that, in response to the view, the data 31 in the database 29 is represented in the spreadsheet. An alternative embodiment includes the step of arranging the interface layer 22 so that the data represented in the spreadsheet is stored via the interface layer 22 in the database 29. Further, if an input causes the data in the representation to be changed, any change in the data may be stored via the interface 22 in the database 29. In a further embodiment, the step of arranging the semantic net server 23 to store a semantic net of the relations between the data 31 in the database layer 28 is included. A further embodiment includes the step of performing a query on the data in the database layer 28, according to the view, via the interface layer 22 so that data is delivered to the spreadsheet layer and represented in the spreadsheet in a predetermined structure. The further step of arranging the semantic net server to store a mapping of the structure of the database onto a plurality of terms and relation types in a semantic net may be carried out.

Also, the step of arranging the semantic net server to store a mapping of the data representing contents of the database onto a plurality of sub-terms corresponding to the plurality of terms, respectively, may be carried out.

The method of FIG. 2 may also include the step of defining the view by the plurality of terms and relation types of the semantic net. It may further include the step of arranging the semantic net server to replicate the data contents 31 of the database layer 28 in the semantic net. The additional step of arranging the interface layer 22 to interpret the view and to identify particular data from the semantic net according to the view may also be carried out.

The further step of adapting the interface to translate the view into a database server compatible view, wherein the database server compatible view collects the data from the database may also be carried out, as may the further step of arranging the semantic net server 23 to map the collected data onto the terms and relations of the semantic net, wherein the mapped data is included in the spreadsheet.

In one embodiment, the step of providing a spreadsheet including at least a title row is carried out. Further, the step of defining the view by entering a view in the title row, wherein the title row includes at least one of a plurality of cells which is associated with a particular relation respectively, and further wherein the relation corresponds to one or more foreign key references and a semantic term corresponding to one or more database entity types, is carried out.

A further embodiment, includes the further step of performing a query according to the view on the database to collect data, wherein the collected data is imported into a representation generated by the spreadsheet layer according to the structure determined by said title row. The step of importing the data represented in a representation generated via the interface to the database may also be carried out.

Embodiments of the present invention have application to a user terminal comprising means operable to perform any of the described methods or steps. Embodiments of the present invention also have application to a program storage device readable by a processing apparatus, the device embodying a program of instructions executable by the processor to perform methods consistent with the invention.

Embodiments of the present invention may be embodied in one or a plurality of applications. For example, the invention may be embodied in a single application incorporating a database layer, an interface layer and a spreadsheet layer. Alternatively, each layer may be embodied by a separate application or set of applications. Alternatively, a single application may embody some but not all of the layers. Embodiments of the invention is not limited in this respect.

Embodiments of the invention as described can be implemented in digital electronic circuitry, or in computer hardware, firmware, software, or in any combination thereof. An apparatus according to the present invention can be implemented in a computer program product tangibly embodied in a machine readable storage device for execution by a programmable processor; and method steps of the invention can be performed by a programmable processor executing a program of instructions to perform functions consistent with the invention by operating on input data and generating output. Embodiments of the invention can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Typically, a processor will receive instructions and data from a read-only memory and/or a random access memory. Typically, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EEPROM, and flash memory devices; magnetic disks such as internal hard disks and removable disks; magneto-optical disks; and CD-ROM disks. Any of the foregoing can be supplemented by, or incorporated in application specific integrated circuits (ASICs).

To provide for interaction with a user, embodiments of the invention can be implemented on a computer system having a display device, such as a monitor or LCD screen, for displaying information to the user and a keyboard and a pointing device, such as a mouse or a trackball by which the user can provide input to the computer system. The computer system can be programmed to provide a graphical user interface through which computer programs interact with users.

While specific embodiments of the invention have been described herein, it will be appreciated that the invention may be practiced otherwise than as described. Furthermore, the description is not intended to limit the invention. For example, the order of steps to be performed to implement methods consistent with the present invention is not limited to the order described herein or prescribed in the claims.

Other embodiments of the invention will be apparent to those skilled in the art from consideration of the specification and practice of embodiments of the invention disclosed herein. It is intended, therefore, that the specification and examples be considered as exemplary only, with a true scope and spirit of the invention being indicated by the following claims.

What is claimed is:

1. A database management system comprising:
   a database layer including a database for storing data;
   a spreadsheet layer for representing data from the database layer in a spreadsheet in accordance with a view, wherein the view causes at least one of a delivery of data to the spreadsheet layer from the database layer and a maintenance of data from the spreadsheet layer to the database layer; and
   an interface layer arranged to interface the database layer with the spreadsheet layer,
   wherein the database layer stores, in the database, data corresponding to a plurality of entities of a plurality of entity types in a plurality of tables, respectively,
   wherein the plurality of entities are linked by a plurality of relations in a predetermined structure,
   wherein the interface layer comprises a semantic net server for transforming the structure of the data in the database layer into a semantic net,
   wherein the view is defined in terms of the semantic net to facilitate an interoperability between the database layer and the spreadsheet layer, and
   wherein the semantic net server stores a mapping of the structure of the database onto a plurality of terms and relation types in the semantic net.

2. A database management system according to claim 1, wherein if the view causes the data in the spreadsheet to be changed, any change in the data is stored in the database layer.

3. A database management system according to claim 1, wherein the semantic net server stores a semantic net of the relations between the data in the database layer.

4. A database management system according to claim 1, wherein the relations between the plurality of tables are stored as a plurality of foreign key references.

5. A database management system according to claim 1, wherein the view is performed on the data in the database layer via the interface layer so that data is delivered to the spreadsheet layer and represented in the spreadsheet in a predetermined structure.

6. A database management system according to claim 1, wherein a query according to the view is performed on the database to collect data and these data are imported into a spreadsheet generated by the spreadsheet layer according to a predetermined structure.

7. A database management system according to claim 1, wherein the data represented in a spreadsheet generated by the spreadsheet layer is imported via the interface layer to the database.

8. A database management system according to claim 1, wherein the semantic net server stores a mapping of the data representing a contents of the database onto a plurality of sub-terms corresponding to the plurality of terms, respectively.

9. A database management system according to claim 1, wherein the view is defined in terms of the plurality of terms and relation types of the semantic net.

10. A database management system according to claim 1, wherein the semantic net server is arranged to replicate the data contents of the database layer in the semantic net.

11. A database management system according to claim 1, wherein the interface layer is arranged to interpret the view and to identify particular data from the semantic net in response to the view.

12. A database management system according to claim 11, wherein the semantic net server is arranged to replicate the data contents of the database layer intermittently.

13. A database management system comprising:
    a database layer including a database for storing data;
    a spreadsheet layer for representing data from the database layer in a spreadsheet in accordance with a view, wherein the view causes at least one of a delivery of data to the spreadsheet layer from the database layer and a maintenance of data from the spreadsheet layer to the database layer; and
    an interface layer arranged to interface the database layer with the spreadsheet layer,
    wherein the database layer stores, in the database, data corresponding to a plurality of entities of a plurality of entity types in a plurality of tables, respectively,
    wherein the plurality of entities are linked by a plurality of relations in a predetermined structure,
    wherein the interface layer comprises a semantic net server for transforming the structure of the data in the database layer into a semantic net,
    wherein the view is defined in terms of the semantic net to facilitate an interoperability between the database layer and the spreadsheet layer, and
    wherein the interface layer is arranged to translate the view into a database server compatible view, and wherein the database server compatible view collects data in accordance with the view from the database.

14. A database management system according to claim 13, wherein the semantic net server is arranged to map the collected data onto the terms and relations of the semantic net, and wherein the mapped data is included in the spreadsheet.

15. A database management system comprising:
a database layer including a database for storing data;
a spreadsheet layer for representing data from the database layer in a spreadsheet in accordance with a view, wherein the view causes at least one of a delivery of data to the spreadsheet layer from the database layer and a maintenance of data from the spreadsheet layer to the database layer; and
an interface layer arranged to interface the database layer with the spreadsheet layer,
wherein the database layer stores, in the database, data corresponding to a plurality of entities of a plurality of entity types in a plurality of tables, respectively,
wherein the plurality of entities are linked by a plurality of relations in a predetermined structure,
wherein the interface layer comprises a semantic net server for transforming the structure of the data in the database layer into a semantic net,
wherein the view is defined in terms of the semantic net to facilitate an interoperability between the database layer and the spreadsheet layer, and
wherein the spreadsheet representation includes at least a title row, and wherein the view is defined by entering a view in the title row, the title row including at least one of a plurality of cells which is associated with a particular relation respectively, the relation corresponding to one or more foreign key references, and a semantic term corresponding to one or more database entity types of the view.

16. A method for managing a database, the method comprising the steps of:
storing data in a database in a database layer;
representing data from the database layer in a spreadsheet in accordance with a view,
wherein the view causes at least one of a delivery of data to the spreadsheet layer from the database layer and a maintenance of data from the spreadsheet layer to the database layer;
interfacing the database layer with the spreadsheet layer,
wherein the database layer stores in the database data corresponding to a plurality of entities of a plurality of entity types in a plurality of tables, respectively, and
wherein the plurality of entities are linked by a plurality of relations in a predetermined structure,
wherein the interfacing step comprises the step of transforming the structure of the data in the database layer into a semantic net, and
wherein the representing step comprises the step of inputting the view defined in terms of the semantic net to facilitate an interoperability between the database layer and the spreadsheet layer; and
arranging the semantic net server to store a mapping of the structure of the database onto a plurality of terms and relation types in the semantic net.

17. A method according to claim 16, wherein if an input causes the data in the spreadsheet to be changed, any change in the data in the spreadsheet is stored via the interface layer in the database layer.

18. A method according to claim 16, further including the step of arranging the semantic net server to store a semantic net of the relations between the data in the database layer.

19. A method according to claim 16, further including the step of arranging the database layer to store data belonging to different entities in different respective tables and to store relations between entities by foreign key references.

20. A method according to claim 16, further including the step of performing the view on the data in the database layer via the interface layer so that data is delivered to the spreadsheet layer and represented in the spreadsheet in a predetermined structure.

21. A method according to claim 16, further including the further step of arranging the semantic net server to store a mapping of the data representing a contents of the database onto a plurality of sub-terms corresponding to the plurality of terms, respectively.

22. A method according to claim 16, further including the step of defining the view in terms of the plurality of terms and relation types of the semantic net.

23. A method according to claim 16, further including the step of arranging the semantic net server to replicate the data contents of the database layer in the semantic net.

24. A method according to claim 23, further including the further step of arranging the semantic net server to replicate the contents of the database intermittently.

25. A method according to claim 16, further including the step of arranging the interface layer to interpret the view and to identify particular data from the semantic net according to the view.

26. A method for managing a database, the method comprising the steps of:
storing data in a database in a database layer;
representing data from the database layer in a spreadsheet in accordance with a view,
wherein the view causes at least one of a delivery of data to the spreadsheet layer from the database layer and a maintenance of data from the spreadsheet layer to the database layer;
interfacing the database layer with the spreadsheet layer,
wherein the database layer stores in the database data corresponding to a plurality of entities of a plurality of entity types in a plurality of tables, respectively, and
wherein the plurality of entities are linked by a plurality of relations in a predetermined structure,
wherein the interfacing step comprises the step of transforming the structure of the data in the database layer into a semantic net, and
wherein the representing step comprises the step of inputting the view defined in terms of the semantic net to facilitate an interoperability between the database layer and the spreadsheet layer; and
arranging the interface layer to translate the view into a database server compatible view, wherein the database server compatible view is used to collect the data from the database.

27. A method according to claim 26, further including the step of arranging the semantic net server to map the collected data onto the terms and relations of the semantic net, wherein the mapped data is included in the representation.

28. A method for managing a database, the method comprising the steps of:
storing data in a database in a database layer;
representing data from the database layer in a spreadsheet in accordance with a view,
wherein the view causes at least one of a delivery of data to the spreadsheet layer from the database layer and a maintenance of data from the spreadsheet layer to the database layer; and
interfacing the database layer with the spreadsheet layer, wherein the database layer stores in the database data corresponding to a plurality of entities of a plurality of entity types in a plurality of tables, respectively, and wherein the plurality of entities are linked by a plurality of relations in a predetermined structure, wherein the interfacing step comprises the step of transforming the structure of the data in the database layer into a semantic net, wherein the representing step comprises the step of inputting the view defined in terms of the semantic net to facilitate an interoperability between the database layer and the spreadsheet layer, and wherein the spreadsheet representation includes at least a title row, and wherein the method further includes the step of defining the view by entering the view in the title row, wherein the title row includes at least one of a plurality of cells which is associated with a particular relation respectively, and wherein the relation corresponds to one or more foreign key references and a semantic term corresponding to one or more database entity types of the view.

29. A method according to claim 16, further including the step of performing a query according to the view on the database to collect data, wherein the collected data is imported into a spreadsheet representation generated by the spreadsheet layer according to a predetermined structure.

30. A method according to claim 16, further including the step of importing the data represented in a spreadsheet via the interface layer to the database layer.

31. A user terminal comprising means operable to perform a method of managing a database, the method comprising the steps of:

storing data in a database in a database layer;

representing data from the database layer in a spreadsheet in accordance with a view, wherein the view causes at least one of a delivery of data to the spreadsheet layer from the database layer and a maintenance of data from the spreadsheet layer to the database layer;

interfacing the database layer with the spreadsheet layer, wherein the database layer stores in the database data corresponding to a plurality of entities of a plurality of entity types in a plurality of tables, respectively, and wherein the plurality of entities are linked by a plurality of relations in a predetermined structure, wherein the interfacing step comprises the step of transforming the structure of the data in the database layer into a semantic net, and wherein the representing step comprises the step of inputting the view defined in terms of the semantic net, to facilitate an interoperability between the database layer and the spreadsheet layer; and arranging the semantic net server to store a mapping of the structure of the database onto a plurality of terms and relation types in the semantic net.

32. A program storage device readable by a processing apparatus, the device embodying a program of instructions executable by the processor to perform a method for managing a database, the method comprising the steps of:

storing data in a database in a database layer;

representing data from the database layer in a spreadsheet in accordance with a view, wherein the view causes at least one of a delivery of data to the spreadsheet layer from the database layer and a maintenance of data from the spreadsheet layer to the database layer;

interfacing the database layer with the spreadsheet layer, wherein the database layer stores in the database data corresponding to a plurality of entities of a plurality of entity types in a plurality of tables, respectively, and wherein the plurality of entities are linked by a plurality of relations in a predetermined structure, wherein the interfacing step comprises the step of transforming the structure of the data in the database layer into a semantic net, and wherein the representing step comprises the step of inputting the view defined in terms of the semantic net to facilitate an interoperability between the database layer and the spreadsheet layer; and arranging the semantic net server to store a mapping of the structure of the database onto a plurality of terms and relation types in the semantic net.

33. A user terminal comprising means operable to perform a method of managing a database, the method comprising the steps of:

storing data in a database in a database layer;

representing data from the database layer in a spreadsheet in accordance with a view, wherein the view causes at least one of a delivery of data to the spreadsheet layer from the database layer and a maintenance of data from the spreadsheet layer to the database layer;

interfacing the database layer with the spreadsheet layer, wherein the database layer stores in the database data corresponding to a plurality of entities of a plurality of entity types in a plurality of tables, respectively, and wherein the plurality of entities are linked by a plurality of relations in a predetermined structure, wherein the interfacing step comprises the step of transforming the structure of the data in the database layer into a semantic net, and wherein the representing step comprises the step of inputting the view defined in terms of the semantic net to facilitate an interoperability between the database layer and the spreadsheet layer; and arranging the interface layer to translate the view into a database server compatible view, wherein the database server compatible view is used to collect the data from the database.

34. A user terminal comprising means operable to perform a method of managing a database, the method comprising the steps of:

storing data in a database in a database layer;

representing data from the database layer in a spreadsheet in accordance with a view, wherein the view causes at least one of a delivery of data to the spreadsheet layer from the database layer and a maintenance of data from the spreadsheet layer to the database layer; and interfacing the database layer with the spreadsheet layer, wherein the database layer stores in the database data corresponding to a plurality of entities of a plurality of entity types in a plurality of tables, respectively, and wherein the plurality of entities are linked by a plurality of relations in a predetermined structure, wherein the interfacing step comprises the step of transforming the structure of the data in the database layer into a semantic net, wherein the representing step comprises the step of inputting the view defined in terms of the semantic net to facilitate an interoperability between the database layer and the spreadsheet layer, and wherein the spreadsheet representation includes at least a title row, and wherein the method further includes the step of defining the view by entering the view in the title row, wherein the title row includes at least one of a plurality of cells which is associated with a particular relation respectively, and wherein the relation corresponds to one or more foreign key references and a semantic term corresponding to one or more database entity types of the view.

35. A program storage device readable by a processing apparatus, the device embodying a program of instructions executable by the processor to perform a method for managing a database, the method comprising the steps of:

storing data in a database in a database layer;

representing data from the database layer in a spreadsheet in accordance with a view, wherein the view causes at least one of a delivery of data to the spreadsheet layer from the database layer and a maintenance of data from the spreadsheet layer to the database layer;

interfacing the database layer with the spreadsheet layer, wherein the database layer stores in the database data corresponding to a plurality of entities of a plurality of entity types in a plurality of tables, respectively, and wherein the plurality of entities are linked by a plurality of relations in a predetermined structure, wherein the interfacing step comprises the step of transforming the structure of the data in the database layer into a semantic net, and wherein the representing step comprises the step of inputting the view defined in terms of the semantic net to facilitate an interoperability between the database layer and the spreadsheet layer; and arranging the interface layer to translate the view into a database server compatible view, wherein the database server compatible view is used to collect the data from the database.

36. A program storage device readable by a processing apparatus, the device embodying a program of instructions executable by the processor to perform a method for managing a database, the method comprising the steps of:

storing data in a database in a database layer;

representing data from the database layer in a spreadsheet in accordance with a view, wherein the view causes at least one of a delivery of data to the spreadsheet layer from the database layer and a maintenance of data from the spreadsheet layer to the database layer; and interfacing the database layer with the spreadsheet layer, wherein the database layer stores in the database data corresponding to a plurality of entities of a plurality of entity types in a plurality of tables, respectively, and wherein the plurality of entities are linked by a plurality of relations in a predetermined structure, wherein the interfacing step comprises the step of transforming the structure of the data in the database layer into a semantic net, wherein the representing step comprises the step of inputting the view defined in terms of the semantic net to facilitate an interoperability between the database layer and the spreadsheet layer, and wherein the spreadsheet representation includes at least a title row, and wherein the method further includes the step of defining the view by entering the view in the title row, wherein the title row includes at least one of a plurality of cells which is associated with a particular relation respectively, and wherein the relation corresponds to one or more foreign key references and a semantic term corresponding to one or more database entity types of the view.

* * * * *